United States Patent
Wu

(10) Patent No.: US 11,227,042 B2
(45) Date of Patent: Jan. 18, 2022

(54) SCREEN UNLOCKING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Zhenhai Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 163 days.

(21) Appl. No.: 15/728,051

(22) Filed: Oct. 9, 2017

(65) Prior Publication Data

US 2018/0035296 A1    Feb. 1, 2018

Related U.S. Application Data

(63) Continuation of application No. PCT/CN2016/081561, filed on May 10, 2016.

(30) Foreign Application Priority Data

May 21, 2015   (CN) .......................... 201510261340.4

(51) Int. Cl.
*G06F 21/00*    (2013.01)
*G06F 21/34*    (2013.01)
(Continued)

(52) U.S. Cl.
CPC ........ *G06F 21/34* (2013.01); *H04M 1/72412* (2021.01); *H04W 12/069* (2021.01); *G06F 3/0488* (2013.01); *H04M 1/72463* (2021.01)

(58) Field of Classification Search
CPC ...... H04W 12/06; G06F 21/34; G06F 3/0488; H04M 1/7253; H04M 1/72577
See application file for complete search history.

(56) References Cited

U.S. PATENT DOCUMENTS

2006/0282541 A1* 12/2006 Hiroki ................... H04W 12/06
                                                                    709/228
2013/0106603 A1*  5/2013 Weast ................ G06Q 10/0639
                                                                    340/539.11
(Continued)

FOREIGN PATENT DOCUMENTS

CN          102946484 A     2/2013
CN          103957103 A     7/2014
(Continued)

OTHER PUBLICATIONS

The World Intellectual Property Organization (WIPO) International Search Report for PCT/CN2016/081561 dated Aug. 16, 2016 7 Pages (including translation).

(Continued)

*Primary Examiner* — Trong H Nguyen
*Assistant Examiner* — Michael M Lee
(74) *Attorney, Agent, or Firm* — Anova Law Group, PLLC

(57) ABSTRACT

A screen unlocking method and apparatus, and a storage medium are provided. The method includes: obtaining a message that carries identity identification information of the first terminal; matching the identity identification information of the first terminal with a preset identification information matching rule; and controlling the screen to be unlocked in response to determining that the identity identification information of the first terminal meets the preset identification information matching rule.

10 Claims, 3 Drawing Sheets

(51) Int. Cl.
H04M 1/72412 (2021.01)
H04W 12/069 (2021.01)
H04M 1/72463 (2021.01)
G06F 3/0488 (2013.01)

(56) References Cited

U.S. PATENT DOCUMENTS

| | | | |
|---|---|---|---|
| 2014/0155031 A1* | 6/2014 | Lee | G06F 21/35 |
| | | | 455/411 |
| 2015/0020081 A1* | 1/2015 | Cho | G06F 9/542 |
| | | | 719/318 |
| 2015/0026580 A1* | 1/2015 | Kang | G06F 3/167 |
| | | | 715/728 |
| 2015/0028996 A1* | 1/2015 | Agrafioti | G06F 21/34 |
| | | | 340/5.82 |
| 2015/0074615 A1* | 3/2015 | Han | H04L 63/0861 |
| | | | 715/863 |
| 2015/0128257 A1* | 5/2015 | Zhao | G06F 21/46 |
| | | | 726/19 |
| 2015/0296074 A1* | 10/2015 | Shah | H04M 1/72577 |
| | | | 455/418 |
| 2015/0371026 A1* | 12/2015 | Gnanasekaran | G06F 21/35 |
| | | | 726/7 |
| 2016/0037346 A1* | 2/2016 | Boettcher | H04M 1/72519 |
| | | | 455/411 |
| 2016/0044445 A1* | 2/2016 | Hu | H04B 5/00 |
| | | | 455/41.3 |
| 2016/0155281 A1* | 6/2016 | O'Toole | G07C 9/00182 |
| | | | 340/5.64 |
| 2016/0342784 A1* | 11/2016 | Beveridge | H04L 67/08 |

FOREIGN PATENT DOCUMENTS

| | | |
|---|---|---|
| CN | 104238940 A | 12/2014 |
| CN | 104573473 A | 4/2015 |
| WO | 2014143814 A1 | 9/2014 |
| WO | 2014143843 A1 | 9/2014 |
| WO | 2014143997 A1 | 9/2014 |
| WO | 2015009122 A1 | 1/2015 |

OTHER PUBLICATIONS

The State Intellectual Property Office of the People's Republic of China (SIPO) Office Action 2 for 201510261340.4 dated Oct. 28, 2019 7 Pages (including translation).

* cited by examiner

SCREEN UNLOCKING METHOD AND APPARATUS, AND STORAGE MEDIUM

CROSS-REFERENCES TO RELATED APPLICATION

This is a continuation application of PCT Patent Application No. PCT/CN2016/081561, filed on May 10, 2016, which claims priority to Chinese Patent Application No. 201510261340.4, entitled "SCREEN UNLOCKING METHOD AND APPARATUS", filed with the Chinese Patent Office on May 21, 2015, the entire contents of both of which are incorporated herein by reference.

FIELD OF THE TECHNOLOGY

The present disclosure relates to the field of communications technology, and in particular, to a screen unlocking method and apparatus, and a storage medium.

BACKGROUND OF THE DISCLOSURE

With development of communications technologies, electronic devices have become a part of people's daily life. Because a function or a program of an electronic device may be enabled by means of a touch, for example, a user needs to lock a touchscreen to prevent a misoperation when the electronic device is not used. When the electronic device is used again, the user needs to unlock the screen for operations.

Using a mobile terminal (a mobile phone, a tablet computer, or the like) as an example, currently, a main method for unlocking a screen of the mobile terminal is pressing a physical button to lighten the screen and then unlocking the screen by operating a touchscreen using a designated gesture. For example, after the touchscreen of the mobile terminal is lightened by pressing a button, a sliding block on the touchscreen is slid to a designated position. Generally, a user may further set a password to guarantee information security of the user, and unlocking can be achieved only when an input password is correct. That is, a password needs to be input each time when the mobile terminal is waken up, and if a wrong password is input, a password needs to be further input for unlocking.

During a process of researching and practicing the existing technology, the inventor of the present disclosure found that, by using the foregoing unlocking method, a user can perform operations on a mobile terminal only after picking up the mobile terminal, for example, unlocking can be performed by pressing a physical button of the mobile terminal, which causes complexity of the unlocking process and time-consuming of the unlocking method.

SUMMARY

An objective of the present disclosure lies in providing a screen unlocking method and apparatus, intended to simplify a terminal unlocking process and improve the unlocking efficiency.

One aspect of the present disclosure provides a screen unlocking method, including: obtaining a message that carries identity identification information of the first terminal; matching the identity identification information of the first terminal with a preset identification information matching rule; and controlling the screen to be unlocked in response to determining that the identity identification information of the first terminal meets the preset identification information matching rule; or feeding back an indication message of performing unlocking by using a password in response to determining that the identity identification information of the first terminal does not meet the preset identification information matching rule.

Another aspect of the present disclosure provides a screen unlocking apparatus, including: a user interface having a screen; a communication interface; a memory; at least one processor coupled to the user interface, the communication interface, the memory. The at least on processor is configured to obtain a message carrying identity identification information of a first terminal; and match the identity identification information of the first terminal with a preset identification information matching rule stored in the memory; and control the screen to be unlocked in response to determining that the identity identification information of the first terminal meets the preset identification information matching rule.

Another aspect of the present disclosures provides a storage medium, for storing a processor executable instruction, the processor executable instruction being executed to perform a screen unlocking method, the method including: obtaining a message that carries identity identification information of the first terminal; matching the identity identification information of the first terminal with a preset identification information matching rule; and controlling the screen to be unlocked in response to determining that the identity identification information of the first terminal meets the preset identification information matching rule.

Compared with the existing technology, in the embodiments, identity identification information sent by a first terminal is obtained; the identity identification information is matched with a preset identification information matching rule; and the screen is controlled to be unlocked if it is determined that the identity identification information meets the preset identification information matching rule. In the embodiments of the present disclosures, determining and analysis are performed on the received identity identification information of the first terminal, and whether to unlock the screen is controlled automatically according to the analysis result. Compared with the existing method in which a user can unlock a mobile terminal only after picking up the terminal or the like, the embodiments simplify the terminal unlocking process, and improve the unlocking efficiency.

BRIEF DESCRIPTION OF THE DRAWINGS

The following makes detailed description of specific implementation manners of the present disclosure with reference to the accompanying drawings, to make technical solutions and other beneficial effects of the present disclosure apparent.

DESCRIPTION OF EMBODIMENTS

Figure 1:
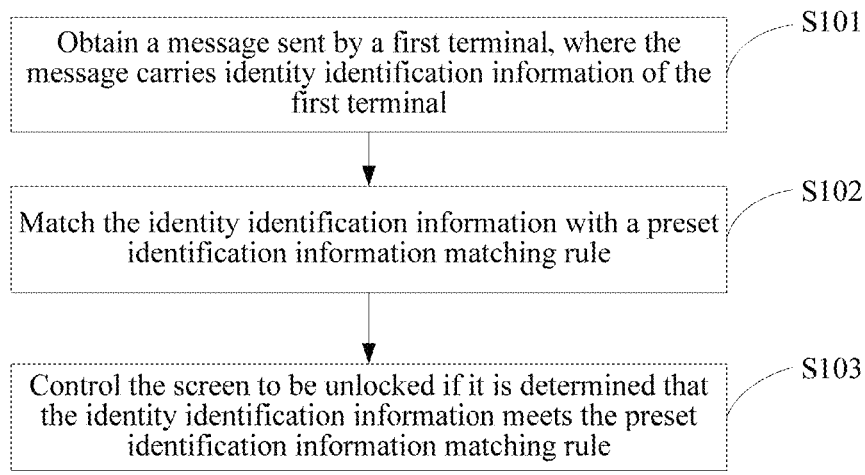
FIG. 1 is a schematic flowchart of a screen unlocking method according to embodiments of the present disclosures.

Referring to the drawings, same component symbols denote same components, and examples of implementation in a proper calculation environment are made to describe principles of the present disclosure. The following description is based on shown specific embodiments of the present disclosures, and the embodiments should not be considered as other specific embodiments that limit the present disclosure and that are not described in detail herein.

In the following description, specific embodiments of the present disclosures are described by referring to steps and characters that are performed by one or more computers, unless there are other requirements. Therefore, the steps and operations are performed by computers, and the "performed by computers" in this specification includes an operation of a computer processing unit of an electronic signal of data in a structural model. The operation transfers the data or maintains the data in a position in a memory system of the computer, and can change operation of the computer by means of reconfiguration or by using a manner known to persons skilled in the art. A data structure maintained by the data is an entity position of the memory, and has a particular feature defined by the data format. However, a principle of the present disclosure is described by using the foregoing text, which is not a limitation. Persons engaged in test in the art may understand that the following multiple steps and operations may also be implemented in hardware.

The principle of the present disclosure is to perform operations by using a lot of other extensive or particular calculation, communication environment, or configuration. Well-known examples of calculation systems, environments and configuration that are applicable to the present disclosure may include (but is not limited to) a hand-held phone, a personal computer, a server, a multi-processor system, a system mainly using a microcomputer, a main-architecture computer, and a distributed calculation environment, and include any of the foregoing system or apparatus.

The term "module" used in the present disclosure may be considered as a plurality of integrated hardware elements, comprising a memory, a user interface, a communication interface and at least one processor coupled to the memory, the user interface and the communication interface, perform at least a certain function. The different components, modules, engines, and services in this specification may be considered as implementation objects in the calculation system.

Referring to FIG. 1, FIG. 1 is a schematic flowchart of a screen unlocking method according to one of the Embodiments of the present disclosures. The method includes:

Step S101: A second terminal obtains a message sent by a first terminal, where the message carries identity identification information of the first terminal.

The screen unlocking method may be run based on the second terminal, and the first terminal and the second terminal may both be constructed by a terminal that has a storage unit and in which a microprocessor is installed and therefore has a calculation capability, such as a notebook computer, a tablet personal computer (PC), and a mobile phone, which is not specifically limited in the present disclosures.

The first terminal may perform message interaction with the second terminal by means of short-distance communication. For example, the first terminal broadcasts and transmits identity identification information to the second terminal by using an iBeacon technology. A working manner of iBeacon is that a device having a Bluetooth low energy (BLE, Bluetooth low energy) communication function sends a distinctive identity identification number (IDentity) of the device to the surroundings by using the BLE technology.

It should be understood that, for convenient description, in this embodiment, a terminal that receives identity identification information is referred to as a second terminal, to distinguish the terminal from a first terminal that sends the identity identification information. The "first" and "second" herein are merely defined for distinguishing, and do not affect implementation of solutions of the present disclosures.

Step S102: The second terminal matches the identity identification information with a preset identification information matching rule.

Step S103: The second terminal controls a screen to be unlocked if it is determined that the identity identification information meets the preset identification information matching rule.

Step S102 and step S103 specifically may be performed in the manners:

It should be understood that, in the second terminal, first, an identification information matching rule is preset, and the identification information matching rule is used for verifying an identity of a user who logs in the terminal; if the identity identification information meets the preset identification information matching rule, it is indicated that the identity verification is successful; and a screen of the second terminal is unlocked, so that the user performs corresponding operations on the second terminal.

It can be known from the above, by means of the screen unlocking method provided in this embodiment, identity identification information sent by a first terminal is obtained; the identity identification information is matched with the preset identification information matching rule; and the screen is controlled to be unlocked if it is determined that the identity identification information meets the preset identification information matching rule. In this embodiment of the present disclosures, determining and analysis are performed on the received identity identification information of the first terminal, and whether to unlock the screen is controlled automatically according to the analysis result. Compared with the existing method in which a user can unlock a mobile terminal only after picking up the terminal or the like, this embodiment simplifies the terminal unlocking process, and improves the unlocking efficiency.

Figure 2A:
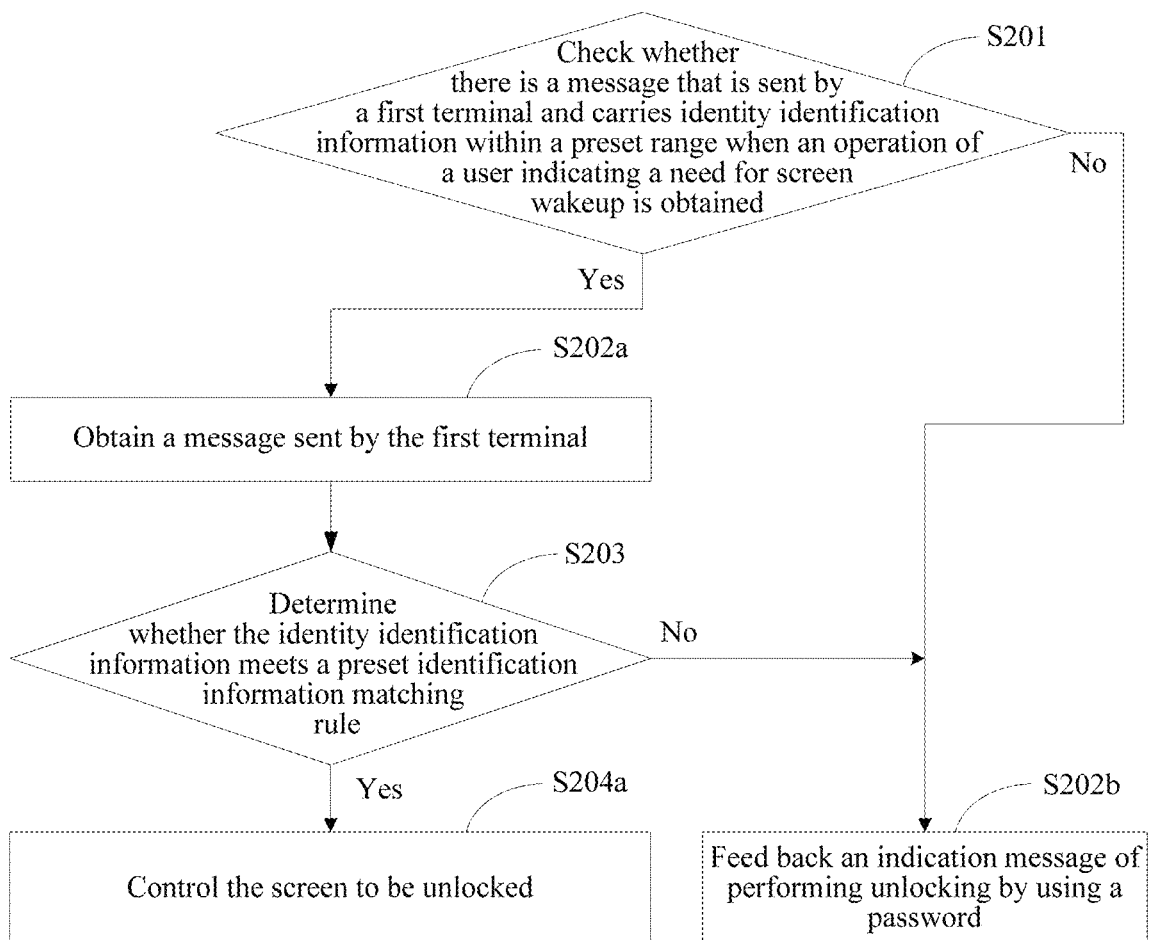
FIG. 2a is a schematic flowchart of a screen unlocking method according to embodiments of the present disclosures.

Referring to FIG. 2*a*, FIG. 2*a* is a schematic flowchart of a screen unlocking method according to an exemplary embodiment of the present disclosures. The screen unlocking method may be run based on a second terminal, and the second terminal may be constructed by a terminal that has a storage unit and in which a microprocessor is installed and therefore has a calculation capability, such as a notebook computer, a tablet PC, and a mobile phone, which is not specifically limited in the present disclosures.

As shown in FIG. 2*a*, the method includes:

Step S201: The second terminal checks whether there is a message that is sent by a first terminal and carries identity identification information within a preset range after an operation of a user indicating a need for screen wakeup is obtained.

It should be understood that, the first terminal may broadcast a message carrying identity identification information to the surroundings within a preset time interval; and when the second terminal receives an operation of the user indicating a need for screen wakeup, the second terminal is triggered to check whether there is a message that is broadcast by the first terminal and carries the identity identification information within a preset range.

Because a touchscreen is locked to prevent a misoperation when the second terminal is not used, a screen wakeup operation needs to be performed when the second terminal is used for a next time. In this embodiment, if it is obtained that a user lightens the screen by pressing or touching, it is determined that an operation of a user indicating a need for screen wakeup is obtained. For example, the screen is lightened by pressing a physical button on the second terminal, which is not specifically limited herein.

According to the check result, if the second terminal detects the message that is broadcast by the first terminal and carries the identity identification information within a preset range, step S202a is performed; or if the second terminal detects no message that is broadcast by the first terminal and carries the identity identification information within a preset range, step S202b is performed.

Step S202a: The second terminal obtains the message sent by the first terminal.

After the message that is sent by the first terminal and carries the identity identification information, step S203 is performed.

Step S202b: The second terminal feeds back an indication message of performing unlocking by using a password.

Optionally, the check result of that there is not the identity identification information within the preset range may be further fed back, and displayed on the screen of the second terminal.

Step S203: The second terminal determines whether the identity identification information meets a preset identification information matching rule.

According to the matching result that is determined, if it is determined that the identity identification information meets the preset identification information matching rule (for example, the identity identification information is consistent with the preset identification information), step S204a is performed; or if the identity identification information does not meet the preset identification information matching rule (for example, the identity identification information is not consistent with the preset identification information), step S202b is performed, that is, feeding back an indication message for performing unlocking by using a password.

Step S204a: The second terminal controls the screen to be unlocked.

Preferably, in this embodiment of the present disclosures, the first terminal may include a portable terminal device such as a wearable device, for example, a smart watch, a smart eyeglass, or a smart earphone; the wearable device broadcasts and transmits identity identification information by using an iBeacon technology; and when the wearable device approaches the second terminal (such as a smart phone or a tablet computer), the second terminal may be automatically unlocked.

Figure 2B:
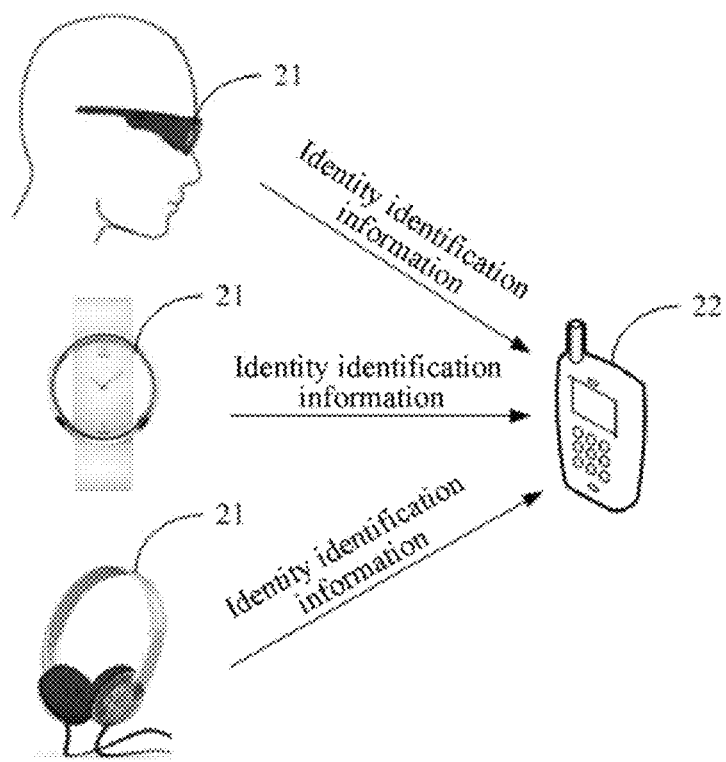
FIG. 2b is a schematic structural diagram of a screen unlocking system according to embodiments of the present disclosures.

Based on description of step 201 to step S204a in combination with FIG. 2b, FIG. 2b is a schematic structural diagram of an unlocking system, and the system includes a first terminal 21 and a second terminal 22. It should be understood that, a working manner of iBeacon is that a device having a Bluetooth low energy (BLE) communication function sends a distinctive identity identification number (IDentity) of the device to the surroundings by using the BLE technology, and application software that receives the ID may take some actions according to the ID.

That is, an iBeacon communication module is disposed in the wearable device, and sends a message carrying identity identification information to the surroundings by using the BLE technology. When a terminal receives the ID and determines that the ID meets a verification requirement, a screen of the terminal is unlocked to perform corresponding operations.

It can be known from the above, by means of the screen unlocking method provided in this embodiment, identity identification information sent by a first terminal is obtained; the identity identification information is matched with a preset identification information matching rule; and the screen is controlled to be unlocked if it is determined that the identity identification information meets the preset identification information matching rule. In this embodiment of the present disclosures, determining and analysis are performed on the received identity identification information of the first terminal, and whether to unlock the screen is controlled automatically according to the analysis result. Compared with the existing method in which a user can unlock a mobile terminal only after picking up the terminal or the like, this embodiment simplifies the terminal unlocking process, and improves the unlocking efficiency.

To better implement the screen unlocking method provided in the embodiments of the present disclosures, this embodiment of the present disclosures further provides an apparatus based on the foregoing screen unlocking method. Meanings of terms are the same as those in the foregoing screen unlocking method, and description in the method embodiments can be referred to for specific implementation details.

Figure 3:
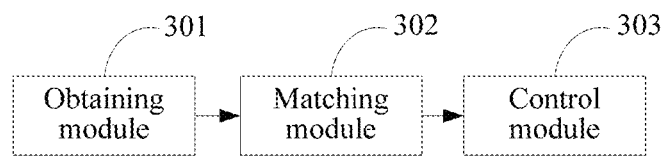
FIG. 3 is a schematic structural diagram of a screen unlocking apparatus according to embodiments of the present disclosures.

Referring to FIG. 3, FIG. 3 is a schematic structural diagram of a screen unlocking apparatus provided in this embodiment of the present disclosures. The screen unlocking apparatus may be run based on a second terminal, and the second terminal may be constructed by a terminal that has a storage unit and in which a microprocessor is installed and therefore has a calculation capability, such as a notebook computer, a tablet PC, or a mobile phone, which is not specifically limited in the present disclosures.

As shown in FIG. 3, the screen unlocking apparatus in the present disclosures may include an obtaining module 301, a matching module 302, and a control module 303. The modules as identified above are the integrated hardware elements, comprising a user interface having a screen, a communication interface, a memory and at least one processor coupled to the user interface, the communication interface and the memory to perform at least a certain function.

The obtaining module 301 is configured to obtain a message sent by a first terminal, where the message carries identity identification information of the first terminal. The matching module 302 is configured to match the identity identification information with the preset identification information matching rule. The control module 303 is configured to control the screen to be unlocked if it is determined that the identity identification information meets the preset identification information matching rule.

It should be understood that, in the second terminal, first, an identification information matching rule is preset, and the identification information matching rule is used for verifying an identity of a user who logs in the terminal; if the identity identification information meets the preset identification information matching rule, it is indicated that the identity verification is successful; and a screen of the second terminal is unlocked, so that the user performs corresponding operations on the second terminal.

It can be known from the above, by means of the screen unlocking apparatus provided in this embodiment, identity identification information sent by a first terminal is obtained; the identity identification information is matched with a preset identification information matching rule; and the screen is controlled to be unlocked if it is determined that the identity identification information meets the preset identification information matching rule. In this embodiment of the present disclosures, determining and analysis are performed on the received identity identification information of the first terminal, and whether to unlock the screen is controlled automatically according to the analysis result. Compared with the existing method in which a user can unlock a mobile terminal only after picking up the terminal or the like, this embodiment simplifies the terminal unlocking process, and improves the unlocking efficiency.

Figure 4:
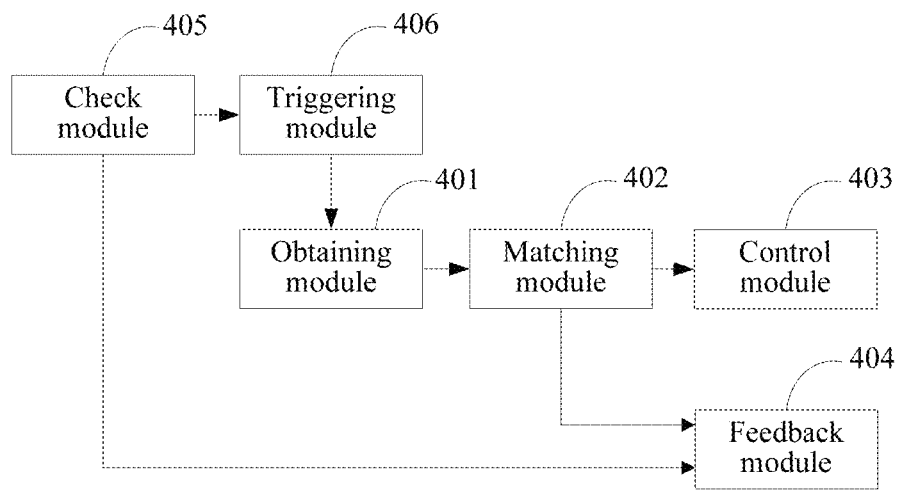
FIG. 4 is a schematic structural diagram of a screen unlocking apparatus according to embodiments of the present disclosures.

Referring to FIG. 4, FIG. 4 is a schematic structural diagram of a screen unlocking apparatus provided in an exemplary embodiment of the present disclosures. The screen unlocking apparatus includes: an obtaining module 401, a matching module 402, and a control module 403. Related description of the obtaining module 301, the matching module 302, and the control module 303 (e.g., as shown in FIG. 3) may be referred to for functions and effects of the foregoing function modules in this embodiment, and details are not described herein again.

Preferably, the apparatus may further include: a feedback module 404, configured to feed back an indication message of performing unlocking by using a password if it is determined that the identity identification information does not meet the preset identification information matching rule.

The apparatus may further include: a check module 405, configured to check whether there is a message that is sent by the first terminal and carries the identity identification information within a preset range after an operation of a user indicating a need for screen wakeup is obtained; a triggering module 406, configured to trigger the obtaining module 401 to obtain the message sent by the first terminal if there is a message that is sent by the first terminal and carries the identity identification information within a preset range; and the feedback module 404, further configured to feed back an indication message of performing unlocking by using a password if there is not a message that is sent by the first terminal and carries the identity identification information within a preset range.

It should be understood that, the first terminal may broadcast a message carrying the identity identification information to the surroundings within a preset time interval; and when the second terminal receives an operation of the user indicating a need for screen wakeup, the second terminal is triggered to check whether there is the identity identification information within a preset range.

Because a touchscreen is locked to prevent a misoperation when the second terminal is not used, a screen wakeup operation needs to be performed when the second terminal is used for a next time. In this embodiment, if it is obtained that a user lightens the screen by pressing or touching, it is determined that an operation of a user indicating a need for screen wakeup is obtained. For example, the screen is lightened by pressing a physical button on the second terminal, which is not specifically limited herein.

Optionally, the feedback module 404 may further feed back, while feeding back an indication message of performing unlocking by using a password, the check result that there is not the identity identification information within a preset range, and display the check result on the screen of the second terminal.

Preferably, based on the above, the apparatus may further include: a determining module, configured to determine that an operation of a user indicating a need for screen wakeup is obtained if it is obtained that the user lightens a screen by pressing or touching.

Further preferably, if the first terminal includes a portable terminal device such as a wearable device, for example, a smart watch, the obtaining module 401 is specifically configured to obtain a message that is sent by the wearable device based on the Bluetooth low energy protocol.

The wearable device broadcasts and transmits identity identification information by using the iBeacon technology. When the wearable device approaches a second terminal (such as a smart phone or a tablet computer), the second terminal may be automatically unlocked.

It should be understood that, a working manner of iBeacon is that a device having a Bluetooth low energy (BLE) communication function sends a distinctive identity identification number (IDentity) of the device to the surroundings by using the BLE technology, and application software that receives the ID may take some actions according to the ID.

That is, an iBeacon communication module is disposed in the wearable device, and sends a message carrying identity identification information to the surroundings by using the BLE technology. When a terminal receives the ID and determines that the ID meets a verification requirement, a screen of the terminal is unlocked to perform corresponding operations. It can be known from the above, by means of the screen unlocking apparatus provided in this embodiment, identity identification information sent by a first terminal is obtained; the identity identification information is matched with a preset identification information matching rule; and the screen is controlled to be unlocked if it is determined that the identity identification information meets the preset identification information matching rule. In this embodiment of the present disclosures, determining and analysis are performed on the received identity identification information of the first terminal, and whether to unlock the screen is controlled automatically according to the analysis result. Compared with the existing method in which a user can unlock a mobile terminal only after picking up the terminal or the like, this embodiment simplifies the terminal unlocking process, and improves the unlocking efficiency.

Figure 5:
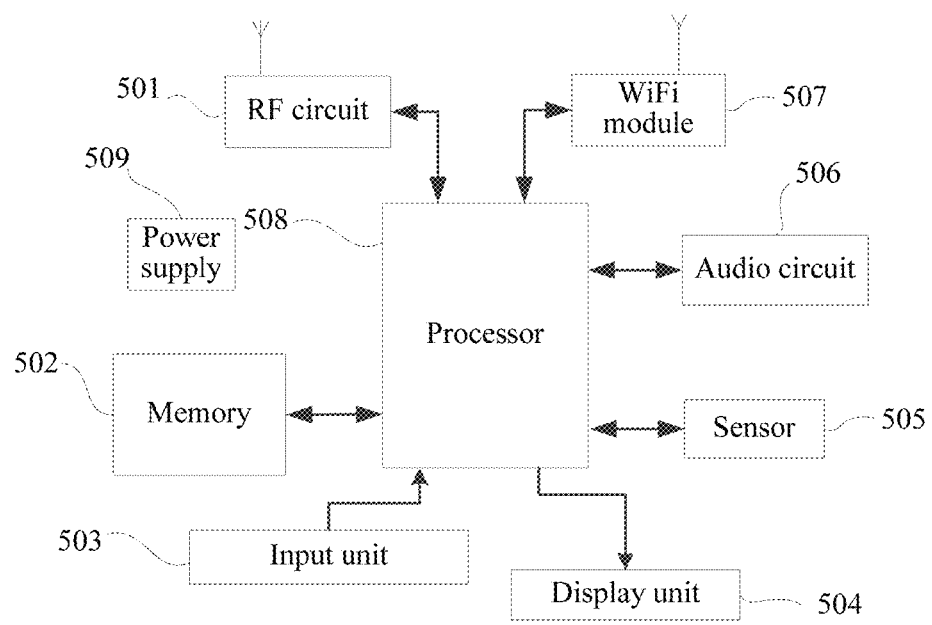
FIG. 5 is a schematic structural diagram of a terminal according to embodiments of the present disclosures.

This embodiment of the present disclosures further provides a terminal. As shown in FIG. 5, the terminal may include components such as a radio frequency (RF) circuit 501, a memory 502 including one or more computer readable storage media, an input unit 503, a display unit 504, a sensor 505, an audio circuit 506, a wireless fidelity (WiFi) module 507, a processor 508 including one or more processing cores, and a power supply 509. A person skilled in the art should understand that the structure of the terminal shown in FIG. 5 does not constitute a limitation to the terminal, and the terminal may include more components or fewer components than those shown in the figure, or some components may be combined, or a different component deployment may be used.

The RF circuit 501 may be configured to receive and send signals during an information receiving and sending process or a call process. Particularly, the RF circuit 501 receives downlink information from a base station, then delivers the downlink information to one or more processors 508 for processing, and sends related uplink data to the base station. Generally, the RF circuit 501 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 501 may also communicate with a network and another device by wireless communication. The wireless communication may use any communication standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 502 may be configured to store a software program and module, and the processor 508 runs the software program and module that are stored in the memory 502, to perform various functional applications and data processing. The memory 502 may mainly include a program storage area and a data storage area. The program storage area may store an operating system, an application program required by at least one function (such as an audio playing function and an image playing function), and the like. The data storage area may store data (such as audio data and an address book) created according to use of the terminal. In addition, the memory 502 may include a high speed random access memory, and may also include a non-volatile memory such as at least one magnetic disk storage component, a flash component, or another volatile solid-state memory device. Correspondingly, the memory 502 may further include a memory controller, so as to provide access of the processor 508 and the input unit 503 to the memory 502.

The input unit 503 may be configured to receive input digit or character information, and generate a keyboard, mouse, joystick, optical, or track ball signal input related to the user setting and function control. Specifically, in a specific embodiment, the input unit 503 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 508. Moreover, the touch controller can receive and execute a command sent from the processor 508. In addition, the touch-sensitive surface may be a resistive, capacitive, infrared, or surface sound wave type touch-sensitive surface. In addition to the touch-sensitive surface, the input unit 503 may further include another input device. Specifically, the another input device may include, but is not limited to, one or more of a physical keyboard, a functional key (such as a volume control key or a switch key), a track ball, a mouse, and a joystick.

The display unit 504 may be configured to display information input by the user or information provided for the user, and various graphical user interfaces of the terminal. The graphical user interfaces may be formed by a graph, a text, an icon, a video, or any combination thereof. The display unit 504 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 508, so as to determine the type of the touch event. Then, the processor 508 provides a corresponding visual output on the display panel according to the type of the touch event. Although, in FIG. 5, the touch-sensitive surface and the display panel are used as two separate parts to implement input and output functions, in some embodiments, the touch-sensitive surface and the display panel may be integrated to implement the input and output functions.

The terminal may further include at least one sensor 505, such as an optical sensor, a motion sensor, and other sensors. Specifically, the optical sensor may include an ambient light sensor and a proximity sensor. The ambient light sensor can adjust luminance of the display panel according to brightness of the ambient light. The proximity sensor may switch off the display panel and/or backlight when the terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not further described herein.

The audio circuit 506, a loudspeaker, and a microphone may provide audio interfaces between the user and the terminal. The audio circuit 506 may convert received audio data into an electric signal and transmit the electric signal to the loudspeaker. The loudspeaker converts the electric signal into a sound signal for output. On the other hand, the microphone converts a collected sound signal into an electric signal. The audio circuit 506 receives the electric signal and converts the electric signal into audio data, and outputs the audio data to the processor 508 for processing. Then, the processor 508 sends the audio data to, for example, another terminal by using the RF circuit 501, or outputs the audio data to the memory 502 for further processing. The audio circuit 506 may further include an earplug jack, so as to provide communication between a peripheral headset and the terminal.

WiFi is a short distance wireless transmission technology. The terminal may help, by using the WiFi module 507, the user to receive and send e-mails, browse a webpage, access streaming media, and so on, which provides wireless broadband internet access for the user. Although FIG. 5 shows the WiFi module 507, it may be understood that the WiFi module is not a necessary component of the terminal, and when required, the WiFi module may be omitted as long as the scope of the essence of the present disclosure is not changed.

The processor 508 is the control center of the terminal, and is connected to various parts of the mobile phone by using various interfaces and lines. By running or executing the software program and/or module stored in the memory 502, and invoking data stored in the memory 502, the processor 508 performs various functions and data processing of the terminal, thereby performing overall monitoring on the mobile phone. Optionally, the processor 508 may include one or more processing cores. Preferably, the processor 508 may integrate an application processor and a modem. The application processor mainly processes an operating system, a user interface, an application program, and the like. The modem mainly processes wireless communication. It should be understood that the foregoing modem may not be integrated into the processor 508.

The terminal further includes the power supply 509 (such as a battery) for supplying power to the components. Preferably, the power supply may be logically connected to the processor 508 by using a power management system, thereby implementing functions such as charging, discharging, and power consumption management by using the power management system. The power supply 509 may further include one or more of a direct current or alternating current power supply, a re-charging system, a power failure detection circuit, a power supply converter or inverter, a power supply state indicator, and any other components.

Although not shown in the figure, the terminal may further include a camera, a Bluetooth module, and the like, which are not further described herein. Specifically, in this embodiment, the processor 508 in the terminal may download, according to the following instruction, executable files corresponding to processes of one or more application programs, in the memory 502, and the processor 508 runs an application program stored in the memory 502, so as to implement various functions:

obtaining a message sent by a first terminal, the message carrying identity identification information of the first terminal; matching the identity identification information with a preset identification information matching rule; and controlling the screen to be unlocked if it is determined that the identity identification information meets the preset identification information matching rule.

Preferably, the processor 508 may further configured to feed back an indication message of performing unlocking by using a password if it is determined that the identity identification information does not meet the preset identification information matching rule.

Based on the foregoing, the processor 508 may further configured to: check whether there is a message that is sent by the first terminal and carries identity identification information within a preset range after an operation of a user indicating a need for screen wakeup is obtained; and trigger to perform the step of obtaining a message sent by the first terminal if there is a message that is sent by the first terminal and carries identity identification information within a preset range; or feed back an indication message of performing unlocking by using a password if there is not a message that is sent by the first terminal and carries identity identification information within a preset range.

Preferably, the processor 508 may further be configured to determine that an operation of a user indicating a need for screen wakeup is obtained if it is obtained that the user lightens a screen by pressing or touching.

Preferably, the first terminal includes a wearable device; and the processor 508 may further be configured to obtain a message that is sent by the wearable device based on the Bluetooth low energy protocol.

It can be known from the above, by means of the terminal provided in this embodiment, identity identification information sent by a first terminal is obtained; the identity identification information is matched with a preset identification information matching rule; and the screen is controlled to be unlocked if it is determined that the identity identification information meets the preset identification information matching result. In this embodiment of the present disclosures, determining and analysis are performed on the received identity identification information of the first terminal, and whether to unlock the screen is controlled automatically according to the analysis result. Compared with the existing method in which a user can unlock a mobile terminal only after picking up the terminal or the like, this embodiment simplifies the terminal unlocking process, and improves the unlocking efficiency.

In the foregoing embodiments, the description of each embodiment has respective focuses. For a part that is not described in detail in an embodiment, detailed description of the screen unlocking method in the foregoing text may be referred to, and details are not described herein again.

The screen unlocking apparatus provided in this embodiment of the present disclosures may be a computer, a tablet computer, a mobile phone having a touching function, or the like. The screen unlocking apparatus and the screen unlocking method in the embodiments of the foregoing text are based on the same concept. Any method provided in the embodiments of the screen unlocking method may be run on the screen unlocking apparatus. The embodiments of the screen unlocking method for a specific implementation process may be referred to, and details are not described herein again.

It should be noted that, for the screen unlocking method in the present disclosure, ordinary persons engaged in test in the art should understand that, all or some procedures of implementing the screen unlocking method in the embodiments of the present disclosures may be completed by using computer programs to control related hardware. The computer program may be stored in a computer readable program, for example, stored in a memory of a terminal, and performed by at least one processor in the terminal, and during a performing process, a procedure of an embodiment of the screen unlocking method may be included. The foregoing storage medium may be a magnetic disk, an optical disc, a read-only memory (ROM), a random-access memory (RAM), or the like.

For the screen unlocking apparatus in this embodiment of the present disclosures, functional modules may be integrated in a processing chip, or may physically and independently exist, or two or more of the functions are integrated in one module. The foregoing integrated module may be implemented in a form of hardware, or may be implemented in a form of a software function module. The integrated module may be stored, if implemented by using a form of a software function module, and sold or used as an independent product, in a computer readable storage medium, where the storage medium is a read-only memory, a magnetic disk, a disc, or the like.

The screen unlocking method and apparatus provided in the embodiments of the present disclosures are described in detail above. The principle and implementation of the present disclosures are described herein through specific examples. The description about the embodiments of the present disclosures is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A screen unlocking method, implemented on an apparatus including a memory and a processor coupled to the memory, the method comprising:

receiving, at a second terminal, an indication indicating a need for unlocking a screen of the second terminal;

in response to receipt of the indication of the need for unlocking the screen of the second terminal, seeking, by the second terminal, message-one containing identity identification information-one and broadcasted by a first terminal at time point-one via a Bluetooth low energy protocol, wherein the first terminal includes a wearable device;

after seeking the message-one, seeking, by the second terminal, message-two containing identity identification information-two and broadcasted by the first terminal at time point-two via the Bluetooth low energy protocol, the time point-two being of a predetermined time interval from the time point-one, wherein an iBeacon communication module is disposed in the wearable device of the first terminal to transmit the message-one and message-two to the second terminal;

matching, at the second terminal, both the identity identification information-one and information-two with a preset identification information matching rule preinstalled to a memory of the second terminal;

automatically unlocking the screen of the second terminal in response to determining that both the identity identification information-one and information-two meet the preset identification information matching rule;

displaying on the screen of the second terminal a first message and a second message in response to determining that the identity identification information-one or the identity identification information-two does not meet the preset identification information matching rule, wherein the first message indicates a failure of meeting the preset identification matching rule and the second message indicates unlocking by sign-in, wherein the preset identification information matching rule is used for verifying an identity of a user of the second terminal, and wherein in response to determining the verifying the identity of the user of the second terminal has failed, it is determined that the identity identification information-one or the identity identification information-two does not meet the preset identification information matching rule;

moving the first terminal out of a preset iBeacon range of the second terminal; and after the screen becomes locked once the first terminal has been moved out of the preset iBeacon range of the second terminal, automatically unlocking again the screen of the second terminal in response to the first terminal's being moved back within the preset iBeacon range.

2. The screen unlocking method according to claim 1, wherein the indication of the need for unlocking the screen of the second terminal is presented by a user's touching the screen of the second terminal.

3. The screen unlocking method according to claim 1, wherein the first message and the second message are displayed at different timepoints.

4. The screen unlocking method according to claim 1, wherein the first message and the second message are separate from each other.

5. The screen unlocking method according to claim 1, further comprising:

displaying on the screen of the second terminal a third message, wherein the third message indicates a check result that either the message-one or the message-two is not detected by the second terminal.

6. The screen unlocking method according to claim 5, wherein the third message is displayed on the screen of the second terminal at a time earlier than the first message or the second message.

7. A screen unlocking apparatus, comprising: a memory storing instructions; and at least one processor coupled to the memory and to execute the instructions, the at least on processor being configured to:

receive, at the apparatus, an indication indicating a need for unlocking a screen of the apparatus;

in response to receipt of the indication of the need for unlocking the screen of the apparatus, seek message-one containing identity identification information-one and broadcasted by a first terminal at time point-one via a Bluetooth low energy protocol, wherein the first terminal includes a wearable device;

after seeking the message-one, seek, message-two containing identity identification information-two and broadcasted by the first terminal at time point-two via the Bluetooth low energy protocol, the time point-two being of a predetermined time interval from the time point-one, wherein an iBeacon communication module is disposed in the wearable device of the first terminal to transmit the message-one and message-two to the apparatus;

match, at the apparatus, both the identity identification information-one and the identity identification information-two with a preset identification information matching rule preinstalled to the memory of the apparatus;

automatically unlocking the screen of the apparatus in response to determining that both the identity identification information-one and the identity identification information-two meet the preset identification information matching rule;

display on the screen of the apparatus a first message and a second message in response to determining that the identity identification information-one or the identity identification information-two does not meet the preset identification information matching rule, wherein the first message indicates a failure of meeting the preset identification matching rule, and the second message indicates unlocking by sign-in, wherein the preset identification information matching rule is used for verifying an identity of a user of the apparatus, and wherein in response to determining the verifying the identity of the user of the apparatus has failed, it is determined that the identity identification information-one or the identity identification information-two does not meet the preset identification information matching rule;

move the first terminal out of a preset iBeacon range of the apparatus; and after the screen becomes locked once the first terminal has been moved out of the preset iBeacon range of the apparatus, automatically unlock again the screen of the apparatus in response to the first terminal's being moved back within the preset iBeacon range.

8. The screen unlocking apparatus according to claim 7, wherein the at least one processor is further configured to recognize the need for unlocking the screen of the apparatus by recognizing a user's touching of the screen of the apparatus.

9. A non-transitory storage medium, for storing processor-executable instructions, the processor-executable instructions being used to instruct a processor to perform a screen unlocking method, the screen unlocking method comprising:

receiving, at a second terminal, an indication indicating a need for unlocking a screen of the second terminal;

in response to receipt of the indication of the need for unlocking the screen of the second terminal, seeking, by the second terminal, message-one containing identity identification information-one and broadcasted by a first terminal at time point-one via a Bluetooth low energy protocol, wherein the first terminal includes a wearable device;

after seeking the message-one, seeking, by the second terminal, message-two containing identity identification information-two and broadcasted by the first terminal at time point-two via the Bluetooth low energy protocol, the time point-two being of a predetermined time interval from the time point-one, wherein an iBeacon communication module is disposed in the wearable device of the first terminal to transmit the message-one and message-two to the second terminal;

matching, at the second terminal, both the identity identification information-one and the identity identification information-two with a preset identification information matching rule preinstalled on a memory of the second terminal;

automatically unlocking the screen of the second terminal in response to determining that both the identity identification information-one and the identity identification information-two meet the preset identification information matching rule;

displaying on the screen of the second terminal a first message and a second message in response to determining that the identity identification information-one or the identity identification information-two does not meet the preset identification information matching rule, wherein the first message indicates a failure of meeting the preset identification matching rule, and the second message indicates unlocking by sign-in, wherein the preset identification information matching rule is used for verifying an identity of a user of the second terminal, and wherein in response to determining the verifying the identity of the user of the second terminal has failed, it is determined that the identity identification information-one or the identity identification information-two does not meet the preset identification information matching rule;

moving the first terminal out of a preset iBeacon range of the second terminal; and after the screen becomes locked once the first terminal has been moved out of the preset iBeacon range of the second terminal, automatically unlocking again the screen of the second terminal in response to the first terminal's being moved back within the preset iBeacon range.

10. The non-transitory storage medium according to claim 9, wherein the need for unlocking the screen is indicated via a user's touching the screen of the second terminal.

* * * * *